United States Patent [19]

Komatsu et al.

[11] 4,163,891

[45] Aug. 7, 1979

[54] ACTIVE GAS PLASMA ARC TORCH AND A METHOD OF OPERATING THE SAME

[75] Inventors: Akio Komatsu; Masaharu Inaba, both of Tokyo, Japan

[73] Assignee: Origin Electric Co., Ltd., Tokyo, Japan

[21] Appl. No.: 906,652

[22] Filed: May 16, 1978

[30] Foreign Application Priority Data

May 20, 1977 [JP] Japan .................................. 52/58508

[51] Int. Cl.² .............................................. B23K 5/00
[52] U.S. Cl. .................................. 219/121 P; 219/75; 313/231.4
[58] Field of Search ................ 219/121 R, 121 P, 74, 219/75, 76.16, 121 L, 137 R; 313/231.3, 231.4

[56] References Cited

U.S. PATENT DOCUMENTS

| | | | |
|---|---|---|---|
| 2,862,099 | 11/1958 | Gage | 219/121 P |
| 3,729,611 | 4/1973 | Vas | 219/121 P |
| 3,949,188 | 4/1976 | Tateno | 219/121 P |

*Primary Examiner*—Gerald P. Tolin
*Assistant Examiner*—M. Paschall
*Attorney, Agent, or Firm*—Harold L. Stowell

[57] ABSTRACT

An active gas plasma arc torch and a method of operating the same, said torch including a rod-shaped cathode, a first gas passage formed around said cathode to feed a protecting gas or shielding gas, a second gas passage formed around said first gas passage to feed a plasma gas and a constricted port for discharging the plasma gas, characterized in that at least a part of the shielding gas which flows out from the first gas passage is removed from the inside of the torch at the position short of said constricted port of the torch, whereby the working quality and the working speed are substantially improved while the rod-shaped cathode is satisfactorily protected by the shielding gas.

2 Claims, 6 Drawing Figures

FIG.4 (a)
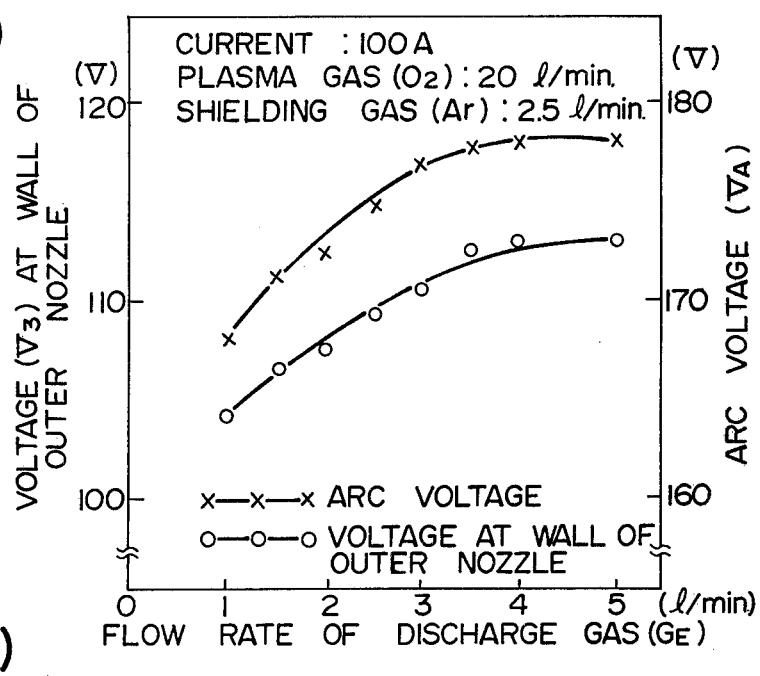
FIG.4(b)
| SHIELDING GAS (G$_N$) FLOW RATE (ℓ/min.) | 2.18 | 2.18 | 2.20 | 2.18 | 2.19 | 2.18 | 2.18 | 2.19 |
|---|---|---|---|---|---|---|---|---|
| DISCHARGE GAS (G$_E$) FLOW RATE (ℓ/min.) | 1.0 | 1.5 | 2.0 | 2.5 | 3.0 | 3.5 | 4.0 | 5.0 |
| CONCENTRATION OF O$_2$ IN DISCHARGE GAS (%) | 5 OR BELOW | 5 OR BELOW | 5 OR BELOW | 9.5 | 23 | 24% OR ABOVE | | |
MEASURED BY DETECTING TUBE PROCESS
(MEASURING RANGE 5-24 %)
FIG.5
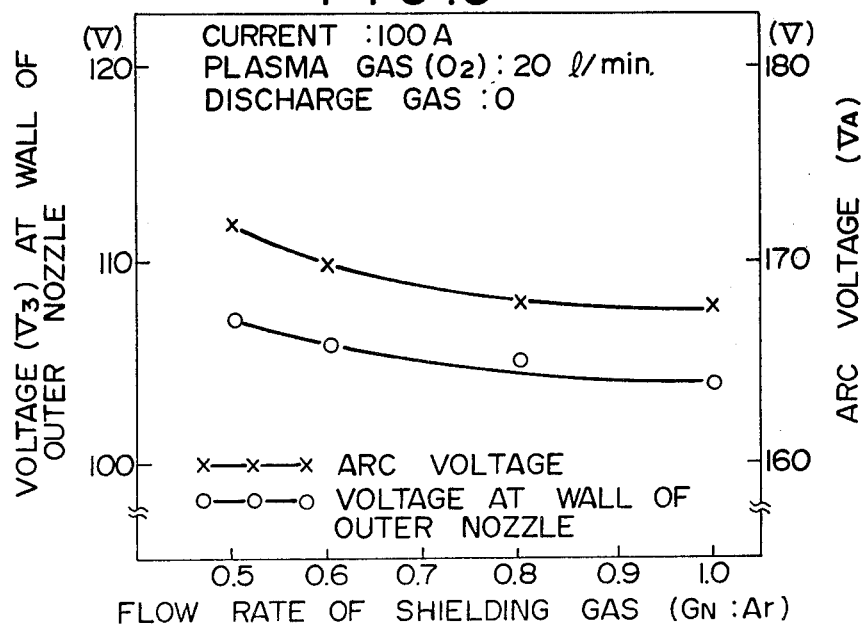

ACTIVE GAS PLASMA ARC TORCH AND A METHOD OF OPERATING THE SAME

The present invention relates to an improvement in an active gas plasma arc torch and a method of operating the same. More particularly, the present invention relates to an arc torch of this kind which includes a rod-shaped cathode, a first gas passage for feeding an inert gas for protecting the cathode, a second gas passage for feeding a plasma gas and a constricted port for discharging the plasma gas.

It is a principal object of the present invention to provide an active gas plasma arc torch and a method of operating the same, in which at least a part of the inert shielding gas is removed from the inside of the torch at the position short of said constricted port of the torch, whereby the working quality and the working speed of the torch are substantially improved while the rod-shaped cathode is satisfactorily protected by the inert shielding gas.

It is another object of the present invention to provide an arc torch of this kind and a method of operating the same which enable to cut iron and steel sheets at high speed with high accuracy.

Now the invention will be explained in detail with reference to the accompanying drawings in which.

FIG. 4 schematically illustrates the present invention, in which FIG. 4(a) is a graph and FIG. 4(b) is a table showing the result of measurement according to the present invention; and FIG. 5 is a drawing for illustrating the conventional method.

Figure 1:
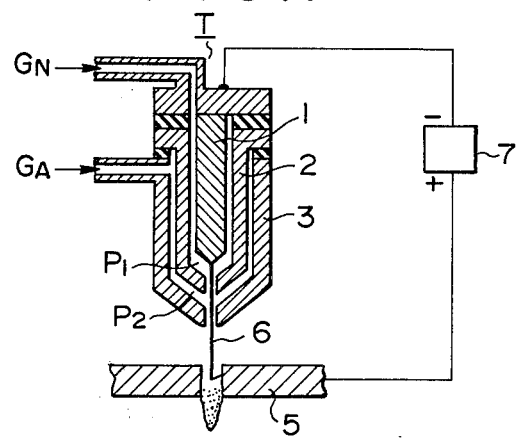
FIG. 1 is a diagram for illustrating the construction of the torch of the conventional type and the method of operating the same.

In general, a plasma arc cutting device employs a non-consumable electrode made of tungsten or like material as a rod-shaped cathode, and employs an oxygen or other active gas as a plasma gas. In such device, if the active gas comes into contact with the cathode it will be immediately consumed by oxidation. In order to prevent such immediate consumption of the rod-shaped cathode, the conventional plasma arc cutting torch has been designed as shown in FIG. 1. According to such conventional design of the cutting torch, an inert gas such as argon gas employed as a shielding gas $G_N$ is passed through a first gas passage $P_1$ formed between a rod-shaped cathode 1 and an inner nozzle 2, while an active gas such as oxygen is passed as a plasma gas $G_A$ through a second passage $P_2$ formed between the inner nozzle 2 and an outer nozzle 3, and the plasma arc cutting operation is effected by a plasma arc column 6 formed between the cathode 1 and a workpiece 5 while the gases are flowing through said first and second passages. In operation, the shielding gas $G_N$ must be fed at the rate enough to prevent the plasma gas $G_A$ from passing into the cathode side. However, as the flowing rate of the shielding gas $G_N$ is increased the cutting quality is lowered. That is, when the shielding gas is being fed at some high rate, the torch can be operated under stable state, but the gas thus fed results in producing increase in heat loss of the outer nozzle 3, considerable decrease of steel-sheet cutting capacity, which forms a characteristic feature of the active gas plasma arc cutting operation, and degradation of the cutting quality in that considerable amount of dross and slag become adhered to the rear surface of the cut workpiece.

In view of the defects of the prior art as explained above, the present invention aims at providing an active gas plasma arc torch and a method of operating the same in which a special passage for removing the shielding gas is formed in order to remove the shielding gas from the torch, as much as possible, at a position short of the constricted port for discharging the plasma gas, whereby the working quality and the working speed are improved.

Figure 2:
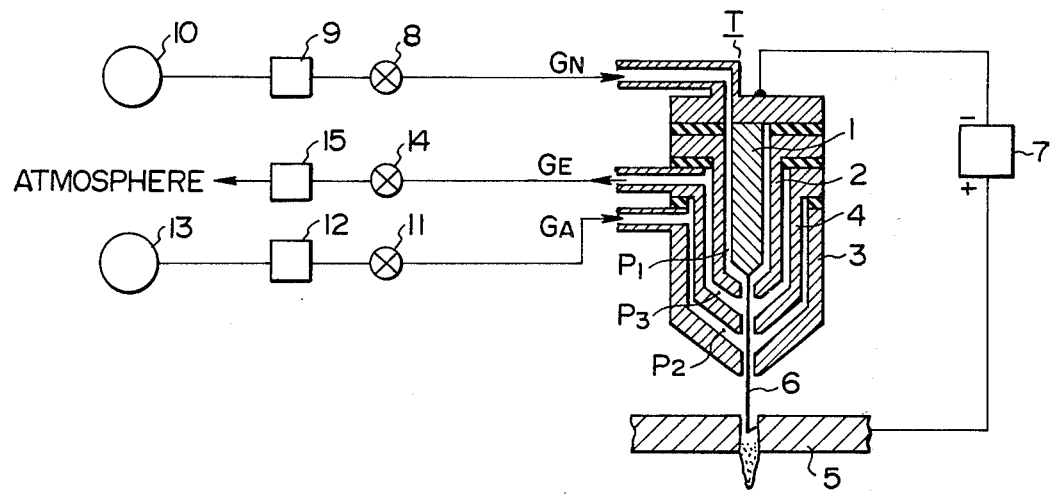
FIG. 2 is a diagram for illustrating the construction of the torch according to the present invention and the method of operating the same during the cutting operation.

FIG. 2 shows a preferred embodiment of the torch according to the present invention, which is in process of plasma arc cutting operation, and the parts associated therewith. In FIG. 2, the part corresponding to that shown in FIG. 1 is designated by the same numeral and/or symbol as used in FIG. 1. Referring to FIG. 2, an intermediate nozzle, which is designated by numeral 4, is disposed between the inner nozzle 2 and the outer nozzle 3, and a gas discharge passage $P_3$ is formed between the inner nozzle 2 and the intermediate nozzle 4. The gas discharge passage $P_3$ serves to remove the shielding gas $G_N$, which passes through the first gas passage $P_1$ and flows out from the discharge port of the inner nozzle 2, to the outside of the torch T.

Referring to FIG. 2, the parts associated with the torch T include a D.C. power source 7 connected across the rod-shaped cathode 1 and the workpiece 5, with polarities as shown, a needle valve 8 and an electromagnetic valve 9 arranged in a shielding gas feeding line, respectively, an inert gas tank 10, a needle valve 11 and an electromagnetic valve 12 arranged in a plasma gas feeding line, respectively, an active gas tank 13, and a needle valve 14 and an electromagnetic valve 15 arranged in a gas discharge line which communicates with the gas discharge passage $P_3$ of the torch T.

Figure 3:
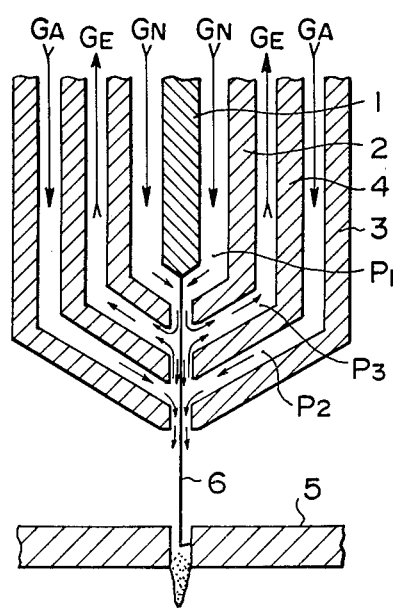
FIG. 3 is an imaginary view showing the gas flows produced in the torch.

Now the method of operating the torch T will be explained. Immediately before the plasma arc column 6 is formed in the conventional manner, the electromagnetic valve 15 is opened to a predetermined extent. The feeding of the protecting gas $G_N$ has been already started from the inert gas tank 10 through the electromagnetic valve 9 and the needle valve 8 into the first gas passage $P_1$, and as the electromagnetic valve 15 is opened to the predetermined extent, as described above, the shielding gas $G_N$ becomes discharged through the gas discharge passage $P_3$, the needle valve 14 and the electromagnetic valve 15 to the outside of the torch T, under the action of the differential pressure between the outside and inside of the torch, namely, the difference between the pressure inside of the torch and the atmospheric pressure. Such state is maintained during operation of cutting the workpiece 6. Now, the gas flows produced in the torch T during such state will be explained with reference to the imaginary view shown in FIG. 3. It appears that the shielding gas $G_N$ which is fed through the first gas passage $P_1$ at a predetermined pressure and discharged from the inner nozzle 2 comes into collision, at the region near the discharge opening of the intermediate nozzle 4, with the plasma gas $G_A$ which is fed through the second gas passage $P_2$ at a predetermined pressure and discharged from the outer nozzle 3, and almost all of the shielding gas $G_N$ and a little part of the plasma gas $G_A$ are passed into the gas discharging passage $P_3$ having lower pressure and discharged from the torch T as an exhaust gas $G_E$. Furthermore, it is noted that the plasma gas $G_A$ has more tendency than the shielding gas $G_N$ to flow out from the constricted port of the outer nozzle, namely, the constricted port for discharging the plasma gas of the torch T. In view of these circumstances, it is considered that if the flow rate of the discharge gas $G_E$ is increased above some critical value almost all of the shielding gas $G_N$ becomes included into the discharge gas $G_E$, so that the working is effected by substantially pure plasma gas $G_A$.

In order to confirm the facts we made experiments in which steel sheets (SS41) having thickness of 12 mm were cut by the torch under the conditions of current of 100 A and cutting speed of 1000 mm/min. The plasma gas ($O_2$) was passed at the rate of 20 l/min. and shielding gas (Ar) was passed at the rate of 2.5 l/min., both under atmospheric pressure. The results are shown in FIGS. 4 and 5.

FIG. 4 shows the result of the method according to the present invention where the flow rate of the discharge gas $G_E$ is varied, and FIG. 5 shows the result of the method according to prior art where the flow rate of the discharge gas $G_E$ is zero, and the flow rate of the shielding gas $G_N$ is varied.

FIG. 4(a) shows the variation of the voltage $V_3$ at the wall of the outer nozzle 3 and the arc voltage $V_A$ relative to the variation of the discharge gas $G_E$. It will be seen from FIG. 4(a) that as the flow rate of the discharge gas $G_E$ is increased the voltages $V_3$ and $V_A$ are raised but when the flow rate of the discharge gas $G_E$ becomes higher than about 4 l/min., these voltages are no longer raised. It is considered that such variation clearly demonstrates the fact that almost all of the shielding gas $G_N$ flowing out from the first gas passage $P_1$ flows into the gas discharge passage $P_3$ and does not flow out from the constricted port of the outer nozzle 3, so that substantially pure plasma gas, for example, pure oxygen gas is discharged from said constricted port.

This fact is further confirmed by the table of FIG. 4(b), which shows the measurements in which the concentration of the plasma gas, that is, oxygen gas in the discharge gas $G_E$ is measured using a gas detecting tube (DRÄGER TUBE OXIGEN 5%/B). It will be seen from this table that when the rate of discharge of the discharge gas $G_E$ is lower than the flow rate of the shielding gas $G_N$ consisting of argon gas, the discharge gas $G_E$ substantially wholly consists of the argon gas and only includes 5% or lower amount of oxygen, and as the flow rate of the discharge gas $G_E$ becomes higher than the flow rate of the shielding gas $G_N$ the more amount of the shielding gas $G_N$ tends to be contained into the discharge gas. In this measurement, a detecting tube which can measure the oxygen concentration in the range from 5% to 24% was employed, and the flow rate of the shielding gas was measured by a flow meter in which the indicating scale calibrated for atmospheric pressure was corrected according to the pressure within the torch in order to indicate substantially actual value of flow rate. The flow rate of the discharge gas $G_E$ was indicated by the value actually measured by a flow meter. Although the values in such measurement may include small errors owing to the errors of the respective flow meters, pressure meter and the like (Flow meter for argon gas was employed to measure the discharge gas), it is clearly seen from this table that almost all of the shielding gas is removed as the discharge gas $G_E$, and as the discharge gas is increased the more amount of the shielding gas is removed as the discharge gas.

Further experiments were effected in which the steel sheets as mentioned above were cut under the same conditions as described above, while only varying the flow rate of the discharge gas $G_E$ to 1.0, 1.5, 2.0 . . . 4.0, 5.0 l/min. In these experiments it is seen that the amount of the dross and slag adhered to the cut portion was minimized in comparison with the case of the conventional method. In case of the method according to the present invention it was observed that only a small amount of dross and slag was adhered to the cut portion when the flow rate of the discharge gas was substantially equal to that of the shielding gas, namely, 2.0–2.5 l/min., and a very small amount of easily removable slag was adhered in granulated form when the flow rate of the discharge gas was 3.0–5.0 l/min.

In case of the conventional method, it was observed that considerable amount of dross and slag was adhered to the cut portion when the flow rate of the shielding gas was decreased to 1.0 l/min. which was lower than half of the flow rate in case of the present invention, and some amount of dross and slag was still adhered even when the flow rate of the protecting gas was decreased to 0.5 l/min. This value of the flow rate of the shielding gas, 0.5 l/min., means a limit value below which the plasma gas $G_A$ tends to flow, little by little, into the cathode side to cause gradual oxidation of the tungsten electrode thereby adversely affecting the respective voltages, in other words, a critical value above which the torch can be operated under stable state. It will be seen from FIG. 5 that as the flow rate of the shielding gas is decreased the respective voltages are raised little by little, and thus it will be understood that the flow rate of the protecting gas passing through the constricted discharge port of the torch is decreased if the flow rate of the shielding gas fed into the torch is held at a constant value and the flow rate of the discharge gas is increased to some high value.

It is clear from the result of the measurements illustrated in FIGS. 4 and 5 that superior result of cutting operation can be obtained, by removing suitable amount of the discharge gas, for example approximately same amount of the discharge gas as that of the shielding gas fed into the torch, while feeding sufficient amount of the shielding gas to obtain the stable operation of the torch (of course, with due regard to the economy), in accordance with the present invention.

Further experiments were effected in which the cutting was made under such conditions that the flow rates of the plasma gas ($O_2$), shielding gas (Ar) and discharge gas were held at constant values, 20 l/min., 2.5 l/min. and 3 l/min., respectively, and the cutting speed was varied to 1.0, 1.25 . . . 2.75 m/min. It was demonstrated by these experiments that superior result of cutting was obtained according to the present invention even at high cutting speed and the cutting quality and the cutting speed were considerably improved, in comparison with the conventional plasma arc cutting.

It will be understood from the above description that in accordance with the present invention the amount of the inert gas passing through the constricted discharge port of the torch is reduced to minimum even if the amount of the inert gas enough to produce the stable operation of the torch is fed into the torch, so that the plasma arc cutting can be performed by nearly pure active gas, thereby providing great advantages such as considerable improvement of cutting quality and cutting speed.

Although it is described in the explanation of the preferred embodiment, that the discharge gas is discharged into atmosphere, it will be advantageous from an economical standpoint, to extract the inert gas from the discharge gas and to reuse the same, particularly in a large-scale working equipment.

We claim:

1. An an active gas plasma arc torch including a rod-shaped cathode, a first gas passage formed around said cathode to feed a shielding gas, a second gas passage formed around said first gas passage to feed a plasma gas and a constricted port for discharging the plasma gas, said cathode and first and second gas passages being arranged in concentric relation with each other, said torch comprising a gas discharge passage formed between said first gas passage and said second gas passage whereby the shielding gas flowing out from said first gas passage is discharged through said gas discharge passage to the outside of the torch.

2. A method of operating an active gas plasma arc torch including a rod-shaped cathode, a first gas passage for feeding a shielding gas, a second gas passage for feeding a plasma gas and a constricted port for discharging a plasma gas; said method comprising, the step of supplying an active plasma gas to a torch, feeding a shielding gas about an electrode for the torch, removing at least a part of the shielding gas, which flows out from the first gas passage, from the inside of the torch at the position short of said constricted port, whereby the amount of the shielding gas passing through said constricted port relative to the amount of said gas fed into said first gas passage is substantially reduced.

* * * * *